UNITED STATES PATENT OFFICE.

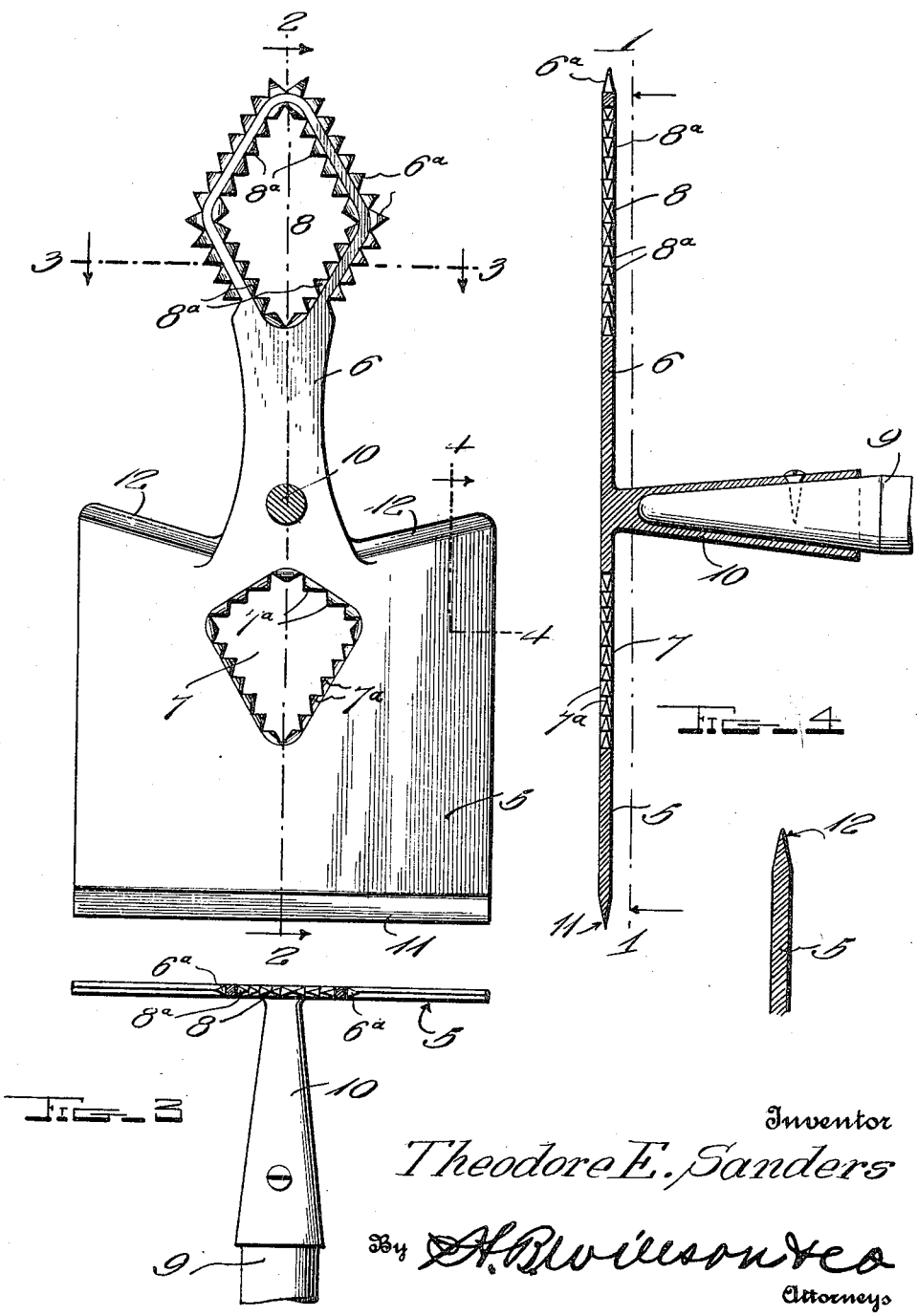

THEODORE ERNEST SANDERS, OF INDEPENDENCE, LOUISIANA.

HOE.

1,317,596.  Specification of Letters Patent.  Patented Sept. 30, 1919.

Application filed May 15, 1919. Serial No. 297,290.

*To all whom it may concern:*

Be it known that I, THEODORE E. SANDERS, a citizen of the United States, residing at Independence, in the parish of Tangipahoa and State of Louisiana, have invented certain new and useful Improvements in Hoes; and I do declare the following to be a full, clear, and exact description of the invention, such as will enable others skilled in the art to which it appertains to make and use the same.

This invention relates to hoes, and it relates more specifically to an improved weeding and pulverizing hoe.

One object of this invention is to provide an improved hoe with openings therethrough to permit the pulverized soil to pass through while bringing clods and other lumpy material to the surface after separating such material from the pulverized soil.

Another object is to provide a hoe which will sever the tough stalks and roots of weeds with comparative ease, and which is engageable with stumps of weeds for pulling them from the ground.

Other objects and advantages may become apparent to persons who read the following details of description in connection with the accompanying drawings, in which:—

Figure 1 is a sectional view illustrating the hoe blade in elevation, the section being taken along the line 1—1 of Fig. 2.

Fig. 2 is a vertical sectional view, the section being taken along the line 2—2 of Fig. 1.

Fig. 3 is a horizontal sectional view, the section being taken along the line 3—3 of Fig. 1.

Fig. 4 is a vertical sectional detail view, the section being taken along the line 4—4 of Fig. 1.

Referring to these drawings in detail, in which similar reference characters correspond with similar parts throughout the several views, the head or plate of the hoe comprises a major blade 5 and a minor blade 6, the latter being relatively narrow so as to be capable of passing between plants which are narrowly spaced from one another; and the wider blade is useful for drawing the dirt toward the vegetables for forming hills, ridges, etc., also for making relatively wide and deep furrows in which to plant seeds and young plants. The blade 5 is formed with an opening 7 having teeth extending inwardly therefrom, and after a weed has been chopped off below its branches, the stalk thereof may be passed through the hole 7 and engaged with the teeth $7^a$ so that the hoe may be used to pull such stalk so as to uproot the same. It will be seen that the teeth $7^a$ are arranged in two downwardly converging series, so that when these teeth are engaged with the root and then pulled in the direction of the minor blade 6, the engagement of the teeth 7' with the weed stalk is increased. Moreover, the upper portion of the opening 7 is formed with two series of teeth $7^a$ converging upwardly, so that a weed stalk may be pulled by means of these upper teeth, or by means of one series of upper teeth and one series of lower teeth which converge laterally toward one another. It will be seen, therefore, that the weed stalk may be pulled by a movement of the hoe blade 5 in either of four directions.

The minor blade 6 is likewise provided with an opening, indicated at 8, and this opening is surrounded by four series of teeth $8^a$ which are also arranged in converging relation to one another, so that weed stalks may be pulled thereby in the same manner as described for the teeth $7^a$. Moreover, the blade 6 is formed with outwardly extending teeth $6^a$ which operate as saw teeth for cutting off weed stalks, roots and the like.

Besides the uses and advantages hereinbefore stated with relation to the teeth $7^a$ and $8^a$, it is to be understood they are useful and efficient for pulverizing the clods, especially where the clods are light and would be knocked aside by being struck by an ordinary hoe, instead of being pulverized. It will be seen that the internal teeth $7^a$ and $8^a$ are also useful for pulverizing clods, by holding the handle 9 vertical, so that the plate or head of the hoe is horizontal, then pushing the plate downward so that its internal teeth strike or bear upon the clod to be pulverized. It is to be understood that the handle 9 may be secured to the hoe head or plate by any appropriate means, a socket 10 being illustrated in Fig. 2 for this purpose.

As an additional means for cutting off stalks and the like after the cutting edge 11 and teeth of the hoe have become dull from long usage, the upper part of the blade 5 may be formed with cutting edges 12.

Although I have described this embodiment of my invention very specifically, it is not intended to limit this invention to these exact details of construction and arrangement of parts, but changes may be made within the scope of the inventive idea as described and claimed herein.

What I claim as my invention is:

1. A hoe comprising a blade having an opening therethrough and having two converging series of teeth extending inward of the opening.

2. A hoe comprising a blade having an opening therein and having two downwardly converging series of teeth and two upwardly converging series of teeth extending inward of said opening.

3. A hoe comprising a blade having an opening therethrough and having two converging series of teeth extending inward of the opening, said blade also having outwardly extending teeth out of and on opposite sides of said opening.

In testimony whereof I have hereunto set my hand.

THEODORE ERNEST SANDERS.